United States Patent
Ray et al.

(10) Patent No.: US 9,307,081 B2
(45) Date of Patent: *Apr. 5, 2016

(54) TELETYPEWRITER (TTY) FOR COMMUNICATING PRE-STORED EMERGENCY MESSAGES TO PUBLIC SAFETY ANSWERING POINTS (PSAPS)

(71) Applicant: CenturyLink Intellectual Property LLC, Denver, CO (US)

(72) Inventors: Amar Nath Ray, Shawnee, KS (US); Lynn T. Greene, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/716,947

(22) Filed: Dec. 17, 2012

(65) Prior Publication Data
US 2013/0108028 A1    May 2, 2013

Related U.S. Application Data

(63) Continuation of application No. 12/395,105, filed on Feb. 27, 2009, now Pat. No. 8,358,744.

(51) Int. Cl.
*H04M 11/04* (2006.01)
*H04M 3/51* (2006.01)
(Continued)

(52) U.S. Cl.
CPC ........ *H04M 3/5116* (2013.01); *H04M 3/42391* (2013.01); *H04M 11/04* (2013.01); *H04M 11/066* (2013.01)

(58) Field of Classification Search
USPC ........... 379/37, 38, 40, 41, 45, 48, 49, 51, 52, 379/67.1, 68, 71, 46
See application file for complete search history.

(56) References Cited

U.S. PATENT DOCUMENTS

| | | | | |
|---|---|---|---|---|
| 5,450,470 A | * | 9/1995 | Alheim | G09B 21/009 340/4.13 |
| 5,457,731 A | * | 10/1995 | Witherspoon | H04M 11/04 379/52 |
| 7,894,578 B2 | | 2/2011 | McClelland | |

(Continued)

OTHER PUBLICATIONS

U.S. Appl. No. 12/395,105; Non-Final Rejection dated May 25, 2012; 20 pages.

(Continued)

*Primary Examiner* — Yosef K Laekemariam
(74) *Attorney, Agent, or Firm* — Swanson & Bratschun, L.L.C.

(57) ABSTRACT

A system and method for communicating a pre-stored emergency message from a TTY to a PSAP may include, in response to receiving an emergency call signal, accessing a pre-stored emergency message stored in a memory. A PSAP may be dialed. In one embodiment, the PSAP may be dialed by the user dialing 911 or the TTY may automatically dial 911 in response to the user selecting a hard or soft-button associated with communicating an emergency message to a PSAP. The pre-stored emergency message may be communicated to a PSAP using a TTY communications protocol. A TTY compatible device utilized by a PSAP operator may be configured to provide the PSAP operator with pre-stored messages available for selection and communication to the emergency caller. By providing pre-stored messages on TTY devices, emergency communications between users of the TTY devices may be expedited, thereby potentially saving lives.

20 Claims, 3 Drawing Sheets

(51) Int. Cl.
*H04M 3/42* (2006.01)
*H04M 11/06* (2006.01)

(56) References Cited

U.S. PATENT DOCUMENTS

| 8,358,744 | B2 | 1/2013 | Ray et al. |
| 2003/0012344 | A1 | 1/2003 | Agarwal et al. |
| 2005/0075116 | A1* | 4/2005 | Laird ............... A61B 5/04 455/456.3 |
| 2005/0232169 | A1* | 10/2005 | McLaughlin ..... H04M 3/42391 370/261 |
| 2007/0280428 | A1 | 12/2007 | McClelland |
| 2008/0166992 | A1* | 7/2008 | Ricordi et al. ............. 455/404.2 |
| 2008/0187108 | A1 | 8/2008 | Engelke et al. |
| 2010/1000395 | | 1/2010 | Greene et al. |
| 2010/0220840 | A1 | 9/2010 | Ray et al. |

OTHER PUBLICATIONS

U.S. Appl. No. 12/395,105; Notice of Allowance dated Sep. 21, 2012; 16 pages.

U.S. Appl. No. 12/395,105; Issue Notification dated Dec. 29, 2012; 1 page.

* cited by examiner

# TELETYPEWRITER (TTY) FOR COMMUNICATING PRE-STORED EMERGENCY MESSAGES TO PUBLIC SAFETY ANSWERING POINTS (PSAPS)

CROSS REFERENCE TO RELATED APPLICATION

This application is a continuation of U.S. patent application Ser. No. 12/395,105, filed Feb. 27, 2009, by Amar Nath Ray et al. and entitled, "Teletypewriter (TTY) for Communicating Pre-Stored Emergency Messages to Public Safety Answering Points (PSAPS)", which is hereby incorporated by reference in its entirety.

BACKGROUND

A teletypewriter (TTY) is a telephone that is configured with a keyboard for users who are deaf or hard of hearing to be able to place calls by typing text messages. A user of a TTY may call another user with a TTY to communicate by using text messages rather than spoken communication. Each key of a TTY creates a specific tone that can be read by a handset on the TTY and the receiver of another TTY receiving the tone may interpret the tones to generate text. One problem that exists for users of TTYs is the ability for the users to be able to type rapidly and accurately. Some deaf and hard of hearing users are accustomed to using sign language, which has a different grammatical system than written language, thereby causing confusion of readers of the text.

In the event that a user of a TTY wants to place a call to a user who does not have a TTY and is capable of hearing, services exist that the TTY user can call to relay messages to a recipient. For example, if a user of a TTY calls to order food from a restaurant to be delivered, the user of the TTY may call the "transcription" or "interpreter" service to relay the text message from the user into a spoken order to the restaurant for the food.

In the event of an emergency for a user of a TTY, public safety answering points (PSAPs) are seldom configured with TTY devices or systems that are compatible with TTY devices. A number of problems exist for callers who use a TTY and emergency operators located at the PSAPs. First, a PSAP that receives a call from a TTY user may not have a TTY compatible device. Second, typing in an emergency situation can be difficult and time consuming for both the caller and operator. Third, urgency of a situation can often be misconstrued or lost on the reader when facts of the situation are typed using a TTY. Fourth, a particular detail that a caller may wish to convey may be difficult given a particular emergency. For example, a fire, medical, or intruder emergency may prevent a caller from being able to sufficiently provide enough detail to notify an operator at the PSAP as to the specific facts of the emergency. Even in the case of using a transcription service, the same or similar difficulties may exist when calling an emergency operator at a PSAP.

SUMMARY OF THE DESCRIPTION

To overcome the problems of a user of a TTY when calling an emergency 911 call to a public safety answering point, the principles of the present invention provide for a TTY to have pre-stored emergency messages that a user of the TTY may select to communicate to a PSAP operator. In addition, the PSAP operator may have a TTY compatible device that is configured with pre-stored emergency messages that may be used in providing responses or asking questions to an emergency caller. The pre-stored emergency messages at the TTY of an emergency caller may be messages that the emergency caller may use to notify a PSAP operator of a type of emergency situation that the user is experiencing and include certain information that is helpful to emergency personnel in preparing for and handling the emergency situation.

One embodiment of a teletypewriter (TTY) for communicating a pre-stored emergency message to a public safety answering point (PSAP) may include an input/output (I/O) unit configured to communicate with a communications network using a TTY communications protocol. A memory may be configured to store at least one pre-stored emergency message. A user interface may be configured to enable a user to generate TTY messages to communicate via the I/O unit over the communications network. A processing unit may be in communication with the I/O unit, memory, and user interface, and be configured to (i) receive an emergency call signal initiated by a user interfacing with the user interface, (ii) access a pre-stored emergency message stored in the memory, (iii) dial a PSAP, and, (iv) in response to an operator at a PSAP answering the call, communicate the pre-stored emergency message to a PSAP operator.

One embodiment of a method for communicating a pre-stored emergency message from a TTY to a PSAP may include, in response to receiving an emergency call signal, accessing a pre-stored emergency message stored in a memory. A PSAP may be dialed. In one embodiment, the PSAP may be dialed by the user dialing 911 or the TTY may automatically dial 911 in response to the user selecting a hard or soft-button associated with communicating an emergency message to a PSAP. The pre-stored emergency message may be communicated to a PSAP using a TTY communications protocol.

One embodiment of a TTY compatible device operating at a PSAP may include an I/O unit configured to communicate with a communications network using a TTY communications protocol. A memory may be configured to store a plurality of messages for communicating to an emergency caller using a TTY. A user interface may be configured to enable a user to select each of the emergency messages stored in the memory. The user interface may be hard-buttons or a graphical user interface, as understood in the art. A processing unit may be in communication with the I/O unit, memory, and user interface, and be configured to (i) display TTY messages received from an emergency caller, (ii) access one of the messages in response to a selection by the PSAP operator, and (iii) communicate the selected message to the emergency caller.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
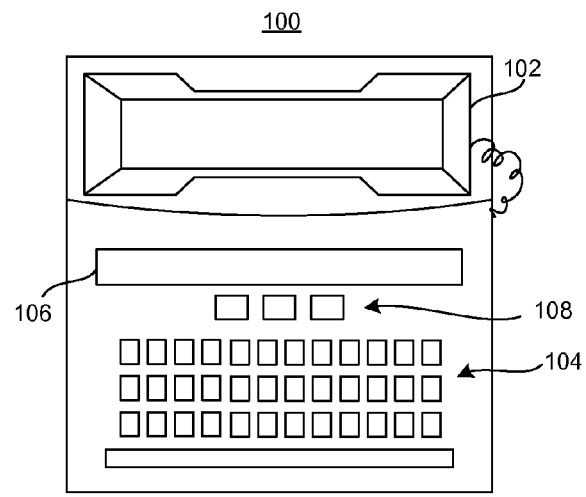
FIG. 1 is an illustration of an illustrative TTY configured to store emergency messages for selection by a user when communicating with a PSAP operator.

With regard to FIG. 1, an illustration of an illustrative TTY 100 configured to enable a user to select pre-stored emergency message(s) is provided. The TTY 100 includes a handset 102 that may be hardwired or cordless, and user interface that may include a keyboard that is the same or similar to a typewriter keyboard. An electronic display 106 may be used to display text that is typed into the user interface 104 and received from another TTY or TTY compatible device used by another user over a communications network, such as the public safety telephone network (PSTN). In one embodiment, the TTY 100 may include one or more hard-buttons 108 that are associated with respective pre-stored emergency messages that may be communicated to a PSAP operator in the event of an emergency. Each of the hard-buttons may be associated with different types of emergencies, including fire, medical, and police and have an associated pre-stored emergency message that may be created to notify each of the respective emergency service providers of information related to each type of emergency. For example, a pre-stored emergency message associated with a fire may include names of residents, telephone number of residents, age of residents, number of stories of home or building, emergency contact names and telephone numbers, or any other information that may be helpful to firemen or emergency medical responders who may anticipate being called to a fire. In response to a user pressing one of the hard-buttons 108, the TTY 100 may automatically dial '911' and communicate the associated pre-stored emergency message to a PSAP operator when the emergency call is answered. The hard-buttons 108 may be configured to dial '911' after being depressed for a minimum time period, such as 2 seconds or pressed in a certain sequence (e.g., 3 times in 1 second).

Figure 2:
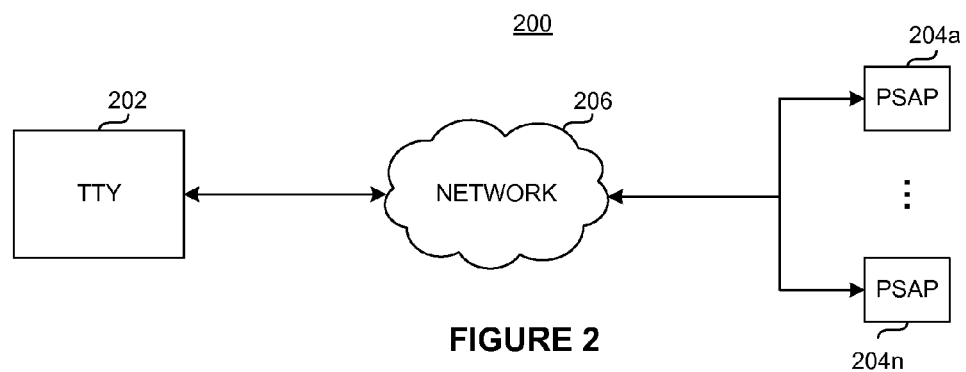
FIG. 2 is an illustration of an illustrative network environment that a TTY and PSAPs may communicate.

With regard to FIG. 2, an illustration of an illustrative network environment 200 is shown to include a TTY 202 and PSAPs 204*a*-204*n* (collectively 204). As understood in the art, the United States has approximately 7,000 PSAPs. As a user of the TTY 202 calls 911 emergency services, the call is routed via a network 206, such as the PSTN, to an appropriate PSAP, such as PSAP 204*a*, that services an area in which the TTY 202 is located. In one embodiment, the TTY 202 may be utilized by a user to communicate an emergency message 208 that is pre-stored in the TTY 202. The pre-stored emergency message 208 may be communicated using a TTY communications protocol, as understood in the art. The PSAP 204*a* may have a TTY or a TTY compatible device that may receive the pre-stored emergency message 208 and display the emergency message 208 in the form of text on an electronic display so that an emergency operator may view the emergency message and respond to the emergency caller using the TTY 202.

Figure 3:
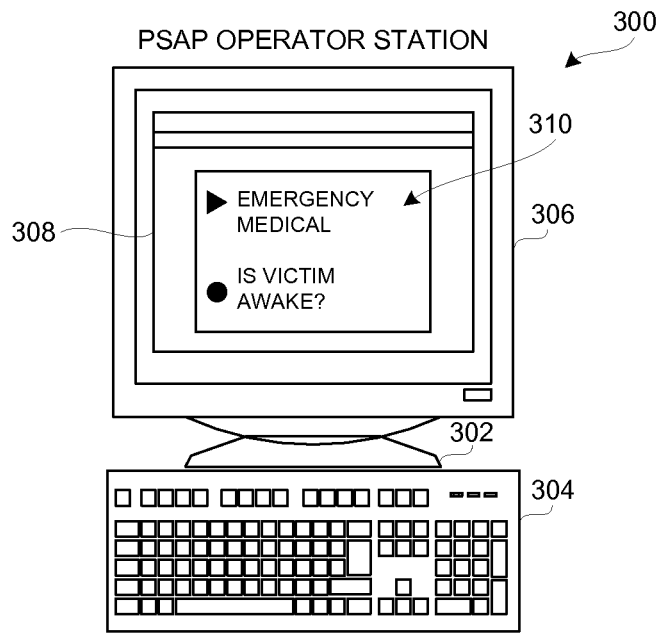
FIG. 3 is an illustration of an illustrative PSAP operator station that is TTY compatible.

With regard to FIG. 3, an illustration of an illustrative TTY compatible device 300 is shown. The TTY compatible device 300 may be a TTY that is the same or similar to that shown in FIG. 1 or a computing system that is configured to receive and communicate TTY communications signals that are compatible with the TTY communications protocol, as understood in the art. The TTY compatible device 300 may include a computing portion 302, keyboard 304, and electronic display 306. The electronic display may be configured to display a graphical user interface 307 in which a window 308 may display text messages 310 that are communicated between an emergency caller and PSAP operator. The TTY compatible device 300 may be configured to provide a PSAP operator with messages that may be selected for communication to an emergency caller. In one embodiment, the TTY compatible device 300 may determine content of text received from an emergency caller and list possible responses based on the content of the text that was received. For example, if a message is received from an emergency caller includes the word "collapsed," then a list of possible responses may include "is the victim diabetic," "is the victim taking medication," "is the victim breathing," "does the victim have a heart condition," etc., where each possible response may be selectably sent to the emergency caller.

Figure 4:
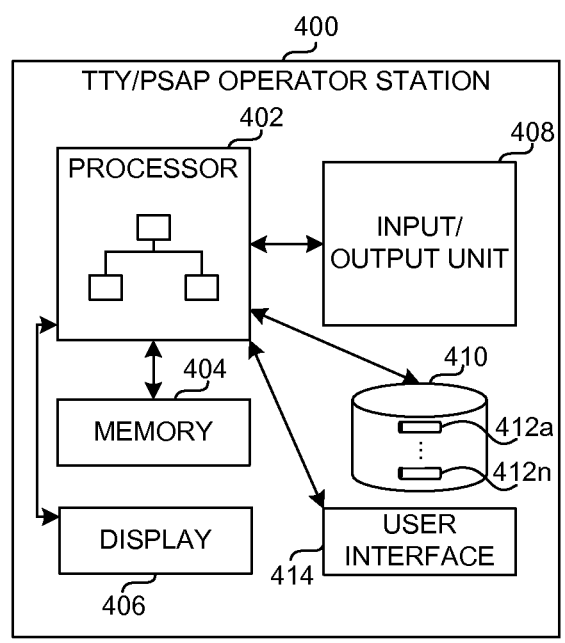
FIG. 4 is a block diagram of an illustrative TTY and PSAP operator station device.

With regard to FIG. 4, a block diagram of an illustrative TTY or PSAP operator station 400 that is a TTY compatible device is provided. The TTY or PSAP operator station 400 may use the same or analogous hardware components as those used for a TTY compatible device that is used by a PSAP operator. The TTY or PSAP operator station 400 may include a processing unit 402 that includes one or more computer processors that executes software 403. The software 403 may be configured to enable a user of the TTY 400 to generate and store emergency messages for use in communicating to a PSAP operator during an emergency telephone call. In one embodiment, the software 403 may be configured to prompt a user to enter information, such as number of residents and emergency contact name and phone number, for storage as an emergency message. The processing unit 402 may be in communication with a memory 404, electronic display 406, input/output (I/O) unit 408, storage unit 410, and user interface 414. The storage unit 410 may be configured to store one or more data repositories 412*a*-412*n* (collectively 412) that may store emergency messages or portions of emergency messages. In addition, a GPS device 416 may be included in the TTY 400 and in communication with the processing unit 402. The GPS device 416 may be configured to generate GPS coordinates and the processing unit 402 may obtain the GPS coordinates for inclusion with an emergency message for communication to a PSAP operator.

The memory 404 may be configured to store one or more emergency messages or portions of emergency messages for use in combining for communication to a PSAP operator. The memory 404 may further be configured to store software or software modules that may be executed by the processing unit 402. The electronic display 406 may be small or large but be configured to enable a user of the TTY or PSAP operator station 400 to generate and receive text messages, as understood in the art. The I/O unit 408 may be configured to communicate using a TTY communications protocol to communicate text data generated by a user of the TTY or PSAP operator station 400 over a communications network. The data repositories 412 may be databases or any other storage area that may store information associated with the user or any other information associated with other people located within an environment of which the TTY or PSAP operator station 400 is located. For example, the information of the user may include name, age, physical handicaps, telephone numbers, relatives, or any other information.

If the TTY or PSAP operator station 400 is used at a PSAP, then the data repositories 412 may be configured to store messages that a PSAP operator may typically use to receive information from an emergency caller. For example, the PSAP operator may typically ask address of caller, if not provided in the pre-stored emergency message from the emergency caller, number of victims, specific situation, location within a building or house, or any other information that may be helpful to emergency personnel who respond to the emergency call. The user interface 414 may be a keyboard and/or touch screen that a user may utilize to generate and communicate emergency messages. In one embodiment, the user interface 414 may include one or more hard-buttons that a user may select to generate a pre-stored emergency message from among one or more pre-stored emergency messages based on the particular emergency situation that he or she is facing. In a similar manner, a PSAP operator may interact with the user interface 414 to select a message to communicate to the emergency caller. By utilizing pre-stored emergency messages, an emergency caller and PSAP operator may more quickly communicate information associated with the emergency situation and request information associated with the emergency situation. By providing a user with the ability to quickly communicate information using pre-stored emergency messages (in the case of an emergency caller) or pre-stored messages (in the case of a PSAP operator), PSAP operators may more quickly determine the emergency situation and notify emergency personnel with enough information to adequately respond thereto.

Although described as the TTY/PSAP operator station 400 having pre-stored message capabilities, albeit the TTY used by a consumer would have different pre-stored messages than those of a PSAP operator, an interpreter who uses a TTY or TTY compatible device may be configured with the same or similar pre-stored messages as would a PSAP operator station. The interpreter may have the ability to receive pre-stored or freeform emergency messages from an emergency caller who may call the interpreter and ask the interpreter to verbally communicate emergency messages to a PSAP operator. In one embodiment, the TTY compatible device utilized by the interpreter may include a user interface, such as a keypad with a dedicated hard-button that may be selected to dial '911' or graphical user interface, that may include a soft-button that may be selected to dial '911', thereby minimizing time for the interpreter to call a PSAP. The interpreter would be able to verbally provide the PSAP operator with pre-stored messages available to communicate back to the emergency caller. The available messages may be prompted to the interpreter based on an emergency message received from the emergency caller or otherwise. Alternatively, the available messages may not be specifically related to an emergency message received from the emergency caller.

An emergency caller of a TTY may call directly to a PSAP. In response to the PSAP answering the call as it does with any wireline call, conventional caller ID information may be provided to the PSAP. In addition, the PSAP may communicate an acknowledgement response to the TTY to indicate that a call connection has been made. In one embodiment, the software 403 and/or processing unit 402 may be configured to receive the acknowledgement response from the TTY and present the caller with an option to connect an interpreter to the call connection as a conventional 3-way call (e.g., "add interpreter to emergency call? Type '1' for yes, '2' for no"). If the emergency caller elects to add an interpreter to the call, then the TTY may call the interpreter and connect the interpreter onto the call so that any text messages communicated by the emergency caller or voice communications communicated by the PSAP operator are received by the interpreter. The interpreter may thereafter be able to communicate text messages to the emergency caller in response to receiving voice communications from the PSAP operator, and voice communications to the PSAP operator in response to receiving text messages from the emergency caller. In an alternative embodiment, the PSAP operator using a TTY compatible device may be provided with an option to add an interpreter to the call in the same or similar manner as the TTY as described above, thereby creating a 3-way call with the emergency caller, PSAP operator, and interpreter.

Figure 5:
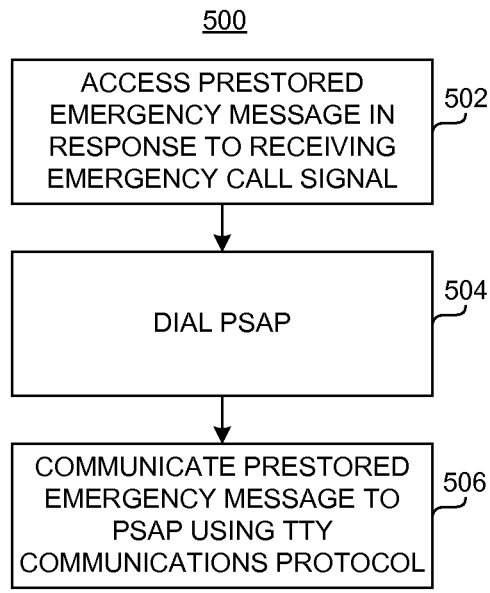
FIG. 5 is a flow diagram of an illustrative process to enable a user of a TTY to communicate a pre-stored emergency message to a PSAP operator.

With regard to FIG. 5, a flow diagram of an illustrative process 500 for a user of a TTY to communicate a pre-stored emergency message to a PSAP operator is provided. The process 500 may include accessing a pre-stored emergency message in response to receiving an emergency call signal. The emergency call signal may be generated by a user in actively selecting a hard-button or a soft-button on a TTY that, in one embodiment, automatically dials "911" and communicates a pre-stored emergency message associated with the hard-button or soft-button. At step 504, a PSAP is dialed by the TTY automatically or in response to a user typing TTY in a user interface at a PSAP. As understood in the art, the communications network to which the TTY is in communication may be configured to automatically route the call to the appropriate PSAP. At step 506, the pre-stored emergency message may be communicated to the PSAP using TTY communications protocol, as understood in the art. The communication may be in response to a PSAP operator answering the call using a TTY compatible device. In one embodiment, the pre-stored emergency message may be selected from one of a plurality of pre-stored emergency messages, where the selection is performed by an emergency caller who selects a particular hard or soft-button on the TTY. In one embodiment, the TTY may remain off-hook until the an acknowledgement response if received, where an acknowledgement response may be a response message from an operator or TTY compatible device. In another embodiment, the TTY may remain off-hook for a maximum period of time, such as three minutes.

Figure 6:
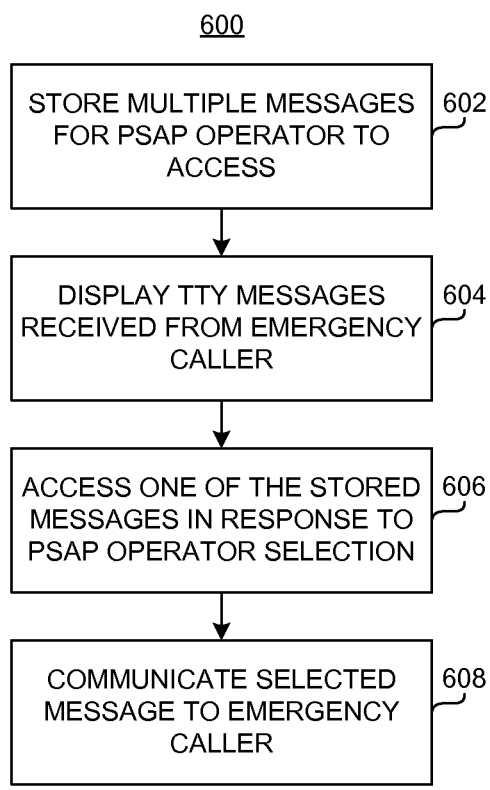
FIG. 6 is a flow diagram of an illustrative process for a PSAP operator to select and communicate messages stored on a PSAP operator station that is TTY compatible.

With regard to FIG. 6, a flow diagram of an illustrative process 600 is shown to enable a TTY compatible device to provide a PSAP operator with pre-stored messages for selection and communication to an emergency caller. The process 600 starts at step 602, where multiple messages are stored for a PSAP operator to access. The messages may be questions or instructions that may be communicated to an emergency caller to retrieve additional information or give instructions to the emergency caller. At step 604, TTY messages received from the emergency caller may be received. The TTY messages may be pre-stored emergency messages or freeform messages communicated from the emergency caller using a TTY. At step 606, one of the stored messages may be accessed in response to the PSAP operator selecting the message. In one embodiment, the message may be selected by the PSAP operator selecting a hard-button, soft-button, or other GUI element. At step 608, the selected message may be communicated to the emergency caller. The communication may be compatible with a TTY communications protocol, as understood in the art. By providing a PSAP operator with stored messages, the PSAP operator may be more efficient to provide assistance to an emergency caller. In one embodiment, the TTY compatible device being used by the PSAP operator may utilize a content identification process that identifies specific words in an emergency message received from an emergency caller and present the PSAP operator with possible messages that he or she may select that potentially relate to the emergency message received. The stored emergency messages may be categorized, such that fire, medical emergency, and other emergencies have messages that are specifically related to expedite the PSAP operator's ability to quickly ask a question or provide instructions to the emergency caller.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A teletypewriter (TTY) for communicating a pre-stored emergency message to a public safety answering point (PSAP), said TTY comprising:
   an input/output (I/O) unit configured to communicate with a communications network using a TTY communications protocol;
   a memory configured to store at least one pre-stored emergency message;
   a user interface configured to enable a user to generate TTY messages to communicate via said (I/O) unit over the communications network; and
   a processing unit in communication with said (I/O) unit, memory, and user interface, and configured to:
      receive an emergency call signal initiated by a user interfacing with said user interface;
      access a pre-stored emergency text message stored in said memory, the pre-stored emergency text message comprising name of the user, age of the user, names of other residents in the user's building, telephone number of the other residents, age of the other residents, and number of stories of the user's building;
      dial a PSAP; and
      in response to an operator at a PSAP answering the call, communicate the pre-stored emergency text message, which comprises the name of the user, the age of the user, the names of other residents in the user's building, the telephone number of the other residents, the age of the other residents, and the number of stories of the user's building, to a PSAP operator.

2. The TTY according to claim 1, wherein said user interface is configured with a dedicated hard-button configured to cause said processing unit to access the pre-stored emergency text message in response to the user activating the hard-button.

3. The TTY according to claim 2, wherein said user interface is configured with multiple hard-buttons each respectively configured to cause said processing unit to access different pre-stored emergency messages stored in said memory.

4. The TTY according to claim 1, wherein said processing unit is further configured to remain in an off-hook state after the pre-stored emergency text message is communicated to the PSAP and an acknowledgement response is returned from the PSAP.

5. The TTY according to claim 1, further comprising a GPS device, and wherein said processing unit is further configured to communicate GPS coordinates determined by said GPS device with the pre-stored emergency text message.

6. The TTY according to claim 1, wherein said processing unit is further configured to:
   in response to determining that an acknowledgement response is received to indicate that a call connection is made with the PSAP, provide the user with an option to add an interpreter to the call; and
   in response to the user electing to add the interpreter to the call, call an interpreter and add the interpreter to the call with the PSAP to create a 3-way call.

7. A method for communicating a pre-stored emergency message from a TTY to a PSAP, said method comprising:
   in response to receiving an emergency call signal from a user of the TTY, accessing a pre-stored emergency text message stored in a memory, the pre-stored emergency text message comprising name of the user, age of the user, names of other residents in the user's building, telephone number of the other residents, age of the other residents, and number of stories of the user's building;
   dialing a PSAP; and
   communicating the pre-stored emergency text message, which comprises the name of the user, the age of the user, the names of other residents in the user's building, the telephone number of the other residents, the age of the other residents, and the number of stories of the user's building, to a PSAP using a TTY communications protocol.

8. The method according to claim 7, wherein the emergency call signal is generated in response to a user activating a hard-button on the TTY.

9. The method according to claim 8, further comprising accessing one of a plurality of pre-stored emergency messages in response to a user activating a respective one of a plurality of hard-buttons.

10. The method according to claim 7, further comprising maintaining the TTY in an off-hook state after communicating the pre-stored emergency text message to the PSAP.

11. The method according to claim 7, further comprising communicating GPS coordinates to the PSAP with the pre-stored emergency text message.

12. The method according to claim 7, further comprising:
   in response to determining that an acknowledgement response is received to indicate that a call connection is made with the PSAP, providing the user with an option to add an interpreter to the call; and
   in response to the user electing to add the interpreter to the call, calling an interpreter and adding the interpreter to the call with the PSAP to create a 3-way call.

13. A TTY compatible device, said TTY compatible device comprising:
   an (I/O) unit configured to communicate with a communications network using a TTY communications protocol;
   a memory configured to store a plurality of messages for communicating to an emergency caller using a TTY;
   a user interface configured to enable a user to select each of the emergency text messages stored in said memory; and
   a processing unit in communication with said (I/O) unit, memory, and user interface, and configured to:
      display TTY messages received from an emergency caller, the TTY messages comprising name of the emergency caller, age of the emergency caller, names of other residents in the emergency caller's building, telephone number of the other residents, age of the other residents, and number of stories of the emergency caller's building;
      access one of the messages in response to a selection by the PSAP operator; and
      communicate the selected message to the emergency caller.

14. The TTY compatible device according to claim 13, wherein said user interface includes a plurality of hard-buttons, each hard-button being associated with a respective message stored in said memory.

15. The TTY compatible device according to claim 13, wherein said processing unit is further configured to:
   display a plurality of selectable messages for a PSAP operator; and
   communicate a selected message to the emergency caller using the TTY communications protocol.

16. The TTY compatible device according to claim 15, wherein said processing unit is further configured to:

process an emergency text message received from an emergency caller;

determine content of the emergency text message; and select a plurality of selectable messages for display based on the determined content of the emergency text message.

17. The TTY compatible device according to claim 16, wherein said processing unit is further configured to:

identify an emergency category to which the emergency text message relates; and select the plurality of selectable messages for display based on the identified emergency category.

18. The TTY compatible device according to claim 13, wherein the TTY compatible device is configured with a user interface that enables the TTY compatible device to call a PSAP.

19. The TTY compatible device according to claim 18, wherein the user interface is a graphical user interface.

20. The TTY compatible device according to claim 13, wherein said processing unit is further configured to, in response to a call connection being made with the emergency caller, present an option to the PSAP operator to connect an interpreter onto the call to create a 3-way call with the emergency caller, PSAP operator, and interpreter.

* * * * *